(12) United States Patent
Komaba et al.

(10) Patent No.: US 9,559,381 B2
(45) Date of Patent: Jan. 31, 2017

(54) SODIUM ION SECONDARY BATTERY

(75) Inventors: Shinichi Komaba, Tokyo (JP); Tomoaki Ozeki, Tokyo (JP); Wataru Murata, Toyama (JP); Toru Ishikawa, Aichi (JP)

(73) Assignee: TOKYO UNIVERSITY OF SCIENCE EDUCATIONAL FOUNDATION ADMINISTRATIVE ORGANIZATION, Tokyo (JP)

( * ) Notice: Subject to any disclaimer, the term of this patent is extended or adjusted under 35 U.S.C. 154(b) by 606 days.

(21) Appl. No.: 13/259,042

(22) PCT Filed: Mar. 25, 2010

(86) PCT No.: PCT/JP2010/002149
§ 371 (c)(1),
(2), (4) Date: Sep. 22, 2011

(87) PCT Pub. No.: WO2010/109889
PCT Pub. Date: Sep. 30, 2010

(65) Prior Publication Data
US 2012/0015256 A1   Jan. 19, 2012

(30) Foreign Application Priority Data
Mar. 27, 2009   (JP) .................................. 2009-079178

(51) Int. Cl.
*H01M 10/0569* (2010.01)
*H01M 10/054* (2010.01)
*H01M 4/587* (2010.01)

(52) U.S. Cl.
CPC ....... *H01M 10/054* (2013.01); *H01M 10/0569* (2013.01); *H01M 4/587* (2013.01)

(58) Field of Classification Search
None
See application file for complete search history.

(56) References Cited

U.S. PATENT DOCUMENTS

2002/0192553 A1* 12/2002 Barker et al. ................. 429/224
2005/0238961 A1   10/2005 Barker et al.
(Continued)

FOREIGN PATENT DOCUMENTS

CN   1630126       6/2005
CN   1723578 A     1/2006
(Continued)

OTHER PUBLICATIONS

Notice of Reasons for Rejection Issued to Chinese Application No. CN201080013443.4, Mailed Jul. 17, 2012.
(Continued)

*Primary Examiner* — Maria J Laios
(74) *Attorney, Agent, or Firm* — Cantor Colburn LLP

(57) ABSTRACT

Disclosed is a sodium-ion secondary battery having excellent charge and discharge efficiencies as well as excellent charge and discharge characteristics, wherein charging and discharging can be repeated without causing problems such as deterioration in battery performance. Specifically disclosed is a sodium ion secondary battery which is provided with a positive electrode, a negative electrode having a negative electrode active material, and a nonaqueous electrolyte solution containing a nonaqueous solvent. The nonaqueous solvent is substantially composed of a saturated cyclic carbonate (excluding the use of ethylene carbonate by itself), or a mixed solvent of a saturated cyclic carbonate and a chain carbonate, and a hard carbon is used as the negative electrode active material. It is preferable that the nonaqueous solvent used for the sodium-ion secondary battery is substantially composed of propylene carbonate, a mixed solvent of ethylene carbonate and diethyl carbonate, or a mixed solvent of ethylene carbonate and propylene carbonate.

5 Claims, 7 Drawing Sheets

(56) References Cited

U.S. PATENT DOCUMENTS

| | | | |
|---|---|---|---|
| 2009/0053613 A1* | 2/2009 | Inoue et al. | 429/338 |
| 2009/0159838 A1 | 6/2009 | Okada et al. | |
| 2010/0035155 A1* | 2/2010 | Okada et al. | 429/221 |
| 2011/0052986 A1 | 3/2011 | Barker et al. | |
| 2011/0171513 A1 | 7/2011 | Kuze et al. | |

FOREIGN PATENT DOCUMENTS

| | | | |
|---|---|---|---|
| CN | 101065867 | 10/2007 | |
| JP | 2004533706 A | 11/2004 | |
| JP | 2007035588 | 2/2007 | |
| JP | 2007234512 A | 9/2007 | |
| JP | 2010034044 A | 2/2010 | |
| KR | 100814540 B1 | 3/2008 | |
| WO | 02097907 A2 | 12/2002 | |
| WO | WO 02/097907 * | 12/2002 | H01M 4/58 |
| WO | WO2006/082719 A1 * | 8/2006 | H01M 4/70 |
| WO | 2008059961 A1 | 5/2008 | |

OTHER PUBLICATIONS

Stevens, D. A. et al., "The Mechanisms of Lithium and Sodium Insertion in Carbon Materials", Journal of the Electrochemical Society, 148 (8), pp. A803-A811 (2001).

Thomas, P. et al., "Electrochemical insertion of sodium into hard carbons", Electrochimica Acta 47, (2002), pp. 3303-3307.

International Search Report for PCT/JP2010/002149, mailed Jun. 8, 2010.

Office Action issued to CN Application No. 201080013443.4, mailed Aug. 19, 2013.

Notice of Reasons for Rejection issued to JP Application No. 2011-505883, mailed Jan. 7, 2014.

Ricardo Alcantara et al., "Carbon Black: A Promising Electrode Material for Sodium-ion Batteries" Electrochemistry Communications 3 (2001) pp. 639-642.

Office Action issued to Korean Application No. KR10-2011-7024625, mailed Apr. 16, 2015.

* cited by examiner

SODIUM ION SECONDARY BATTERY

CROSS-REFERENCE TO RELATED APPLICATIONS

This application is the National Stage of International Application No. PCT/JP2010/002149, filed Mar. 25, 2010, which claims the benefit of Japanese Application No. 2009-079178, filed Mar. 27, 2009, the entire contents of all of which are incorporated by reference herein.

FIELD OF THE INVENTION

The present invention relates to a sodium-ion secondary battery.

BACKGROUND OF THE INVENTION

Presently, as secondary batteries of high-energy density, lithium-ion secondary batteries are widely employed that are made using a nonaqueous electrolyte solution in which an electrolyte salt is dissolved in a nonaqueous solvent, so as to carry out charge/discharge by causing lithium ions to migrate between the cathode and anode.

In such lithium-ion secondary batteries, a lithium-transition metal oxide having a layered structure such as of lithium nickel oxide ($LiNiO_2$) and lithium cobalt oxide ($LiCoO_2$) is generally used as the cathode. In addition, a carbon material, lithium metal, lithium alloy, and the like capable of storing and releasing lithium are used as the anode.

In addition, as the nonaqueous electrolyte solution, a solution has been used in which an electrolyte salt such as lithium tetrafluoroborate ($LiBF_4$) and lithium hexafluorophosphate ($LiPF_6$) in a nonaqueous solvent such as ethylene carbonate and diethyl carbonate.

On the other hand, in recent years, investigation has begun into sodium-ion secondary batteries in which sodium ion is employed in place of lithium ion. The anode of this sodium-ion secondary battery is formed by a metal including sodium. Therefore, sodium is necessary when manufacturing sodium-ion secondary batteries. Since the resource deposits of sodium are abundant, provided that secondary batteries employing sodium ion in place of lithium ion can be manufactured, it will be possible to manufacture secondary batteries at low cost.

It is necessary to store and release sodium in the anode in order to realize a sodium-ion secondary battery. In this regard, research results have been reported that sodium can be stored and released in the anode in the case of using hard carbon as the anode active material (e.g., refer to Non-patent Documents 1 and 2).

Although examples of storing and releasing sodium in the anode have been reported in the case of using hard carbon as the anode active material, the storage and release can only be repeated for a few cycles. Therefore, technology that improves the cycle performance of batteries has been sought for the development of a superior sodium-ion secondary battery.

Examples of storing and releasing sodium in an anode have also been reported in Non-patent Document 2 in a case of using hard carbon as the anode active material, similarly to Non-patent Document 1. The technology described in Non-patent Document 2 is different from the technology described in Non-patent Document 1 in the aspect of using ethylene carbonate as the nonaqueous solvent and using $NaClO_4$ as the electrolyte salt. The technology described in Non-patent Document 2 is superior compared to the technology described in Non-patent Document 1 in the aspect of the cycle characteristics of the battery. However, in a case of using ethylene carbonate independently as the nonaqueous solvent, the ethylene carbonate is a solid at room temperature, and thus makes a secondary battery that cannot be used at room temperature. Therefore, it has been demanded to make improvements in this secondary battery such that it can be used at room temperature.

In addition, a sodium-ion secondary battery that uses a specific carbon material as the anode active material has been disclosed (Patent Document 1). The sodium-ion secondary battery described in Patent Document 1 is rechargeable at room temperature due to using a mixed solvent of ethylene carbonate and diethyl carbonate as the nonaqueous solvent. Furthermore, the sodium-ion secondary battery described in Patent Document 1 is able to undergo reversible charge/discharge, and can achieve suitable charge/discharge characteristics. However, although a common carbon material including the carbon material described in Patent Document 1 has a layered structure, a problem exists in that the conductivity is poor in a direction perpendicular to the laminated direction. In addition, when using a carbon material having a layered structure, the volumetric change while charging/discharging is great, and thus a problem arises in that the electrode is damaged by this volumetric change, and if propylene carbonate or the like and an organic solvent contact, delamination will occur in the layered structure, and thus a problem also arises in that the battery performance declines.

Although sodium-ion secondary batteries are useful as shown above, there have been problems in the aspect of conventional sodium-ion secondary batteries not being able to be used at room temperature, and the aspect of the battery performance decline caused by the carbon material used as the anode active material. As a result, a sodium-ion secondary battery has been sought that can be used at room temperature and suppresses a decline in the battery performance originating from the anode active material.

[Patent Document 1] Japanese Unexamined Patent Application, Publication No. 2007-35588

[Non-patent Document 1] Journal of the Electrochemical Society, 148(8) A803-A811 (2001)

[Non-patent Document 2] Electrochimica Acta, 47 (2002) 3303-3307

SUMMARY OF THE INVENTION

Problems to be Solved by the Invention

The present invention has been made in order to solve the above-mentioned problems, and an object thereof is to provide a sodium-ion secondary battery that can be used at room temperature and suppresses a decline in battery performance originating from the anode active material.

Means for Solving the Problems

The present inventors have thoroughly researched in order to solve the aforementioned problems. As a result thereof, it was found that the above-mentioned problems could be solved by using a substantially saturated cyclic carbonate (excluding using ethylene carbonate independently), or a mixed solvent of saturated cyclic carbonate and linear carbonate as the nonaqueous solvent, and using hard carbon as the anode active material, thereby arriving at completion of the present invention. More specifically, the present invention provides the following.

According to a first aspect, a sodium-ion secondary battery includes: a cathode; an anode having an anode active material; and a nonaqueous electrolyte solution containing a nonaqueous solvent, in which the nonaqueous solvent substantially contains a saturated cyclic carbonate (excluding using ethylene carbonate independently), or a mixed solvent of a saturated cyclic carbonate and a linear carbonate, and the anode active material is hard carbon.

According to a second aspect, in the sodium-ion secondary battery as described in the first aspect, the saturated cyclic carbonate is a compound represented by the following general formula (I),

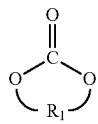
(I)

(R₁ in the general formula (I) is an alkylene group having 2 to 4 carbon atoms.)

According to a third aspect, in the sodium-ion secondary battery as described in the first or second aspect, the linear carbonate is a compound represented by the following general formula (II).

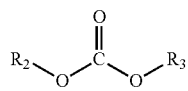
(II)

(R₂ and R₃ in the general formula (II) are each independently an alkyl group having no more than 3 carbon atoms that may be the same or different.)

According to a fourth aspect, in the sodium-ion secondary battery as described in any one of the first to third aspects, the nonaqueous solvent substantially contains propylene carbonate, a mixed solvent substantially of ethylene carbonate and diethyl carbonate, or a mixed solvent substantially of ethylene carbonate and propylene carbonate.

Effects of the Invention

According to the present invention, a sodium-ion secondary battery is obtained for which the decline in battery performance caused by the anode active material is extremely small due to using hard carbon as the anode active material. Furthermore, the sodium-ion secondary battery of the present invention can be used at room temperature.

DETAILED DESCRIPTION OF THE INVENTION

Figure 1A:
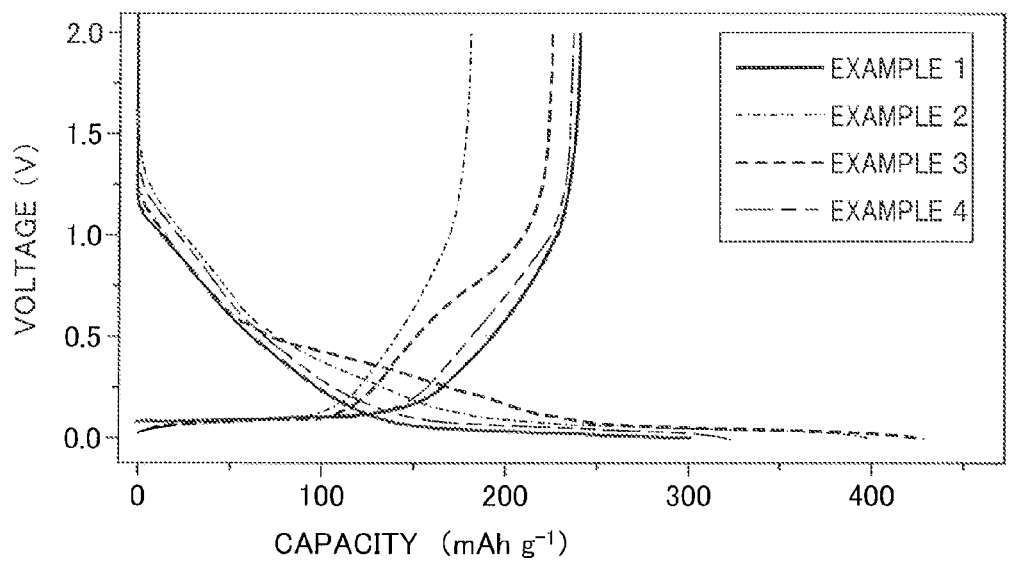
FIG. 1(a) is a graph showing the initial charge/discharge curves of the batteries prepared in Examples 1 to 4.

Hereinafter, embodiments of the present invention will be explained in detail.

A sodium-ion secondary battery of the present invention is a sodium-ion secondary battery provided with a cathode, an anode having an anode active material, and a nonaqueous electrolyte solution containing a nonaqueous solvent. The present invention is characterized in the aspect of using a substantially saturated cyclic carbonate (excluding using ethylene carbonate independently), or a mixed solvent of saturated cyclic carbonate and linear carbonate as the nonaqueous solvent, and using hard carbon as the anode active material. Hereinafter, the sodium-ion secondary battery of the present invention will be explained in the order of the anode, cathode, and nonaqueous electrolyte solution.

Anode

The anode has a current collector and an anode active material layer containing the anode active material and a binding agent formed on the surface of this current collector.

Anode Active Material Layer

The anode active material layer contains the anode active material and binding agent as described above. Hereinafter, the anode active material, binding agent and other components contained in the anode active material layer will be explained.

Anode Active Material

The anode active material used in the present invention is hard carbon. By using hard carbon as the anode active material, a decline in the battery performance originated at the anode active material is suppressed. In addition, the sodium-ion secondary battery possesses superior charge/discharge efficiency and charge/discharge characteristics from combining hard carbon and a nonaqueous solvent substantially composed of saturated cyclic carbonate (excluding using ethylene carbonate independently) or a mixed solvent of saturated cyclic carbonate and linear carbonate.

Hard carbon is a carbon material for which the layer order does not significantly change even if heat treated at high temperatures of 2000° C. or higher. As the hard carbon, a carbon material can be exemplified that is made by air oxidizing, at about 150 to 300° C., an organic compound and carbon fiber that was made from infusibilized yarn, which is an intermediate product of the manufacturing process of carbon fiber, having been carbonized at about 1000 to 1400° C., and then carbonizing at about 1000 to 1400° C. The manufacturing method of the hard carbon is not particularly limited, and hard carbon manufactured by a conventional well-known method may be employed.

The average particle size, real density, plane spacing of the (002) plane, and the like of the hard carbon are not particularly limited, and a suitable and preferable hard carbon can be selected and implemented.

The preferred content of the anode active material is 80 to 99% by mass relative to the mass of the anode active material layer. A more preferred content is 90 to 99% by mass.

Binding Agent

The usable binding agents are not particularly limited, and a conventional well-known binding agent can be employed. More specifically, polyvinylidene fluoride (hereinafter referred to as PVDF), polytetrafluoroethylene (hereinafter referred to as PTFE), a copolymer of tetrafluoroethylene-hexafluoropropylene-vinylidene fluoride, a copolymer of hexafluoropropylene-vinylidene fluoride, a copolymer of tetrafluoroethylene-perfluorovinyl ether, and the like can be exemplified. These may each be used independently, and may be used by mixing two or more thereof. For example, polysaccharides such as starch, methyl cellulose, carboxymethyl cellulose, hydroxymethyl cellulose, hydroxyethyl cellulose, hydroxypropyl cellulose, and carboxymethylhydroxyethyl cellulose; derivatives thereof; and the like can be exemplified as other examples of the binding agent. In addition, inorganic particles, e.g., colloidal silica, etc., can also be exemplified as the binding agent.

The content of the binding agent is preferably 20 to 1% by mass, and more preferably 10 to 1% by mass relative to the mass of the anode active material layer.

Other Components

The anode active material layer may further have other components other than the binding agent and anode active material in a range that does not hinder the effects of the present invention, if there is a necessity. For example, conductive additives, support salts, ion-conductive polymers, and the like can be exemplified. In addition, in a case of an ion-conductive polymer being contained, a polymerization initiator for causing a polymer thereof to polymerize may be contained. Furthermore, the blending amount of these components is not particularly limited, and can be adjusted by referring to the well-known findings concerning sodium-ion secondary batteries as appropriate.

Current Collector

The current collector is configured from a foil, mesh, nickel, expanded grid (expanded metal), punched metal, or the like using a conductive material such as nickel, copper, and stainless steel (SUS). The size, wire diameter, and mesh number of the mesh are not particularly limited, and a conventional well-known mesh can be employed. The typical thickness of a current collector is 5 to 30 µm. However, a current collector having a thickness outside of this range may be used.

The size of the current collector is decided based on the application of the battery. If preparing large electrodes to be used in a large battery, a current collector having a large surface area is used. If preparing small electrodes, a current collector having a small surface area is used.

Anode Production Method

The production method for the anode to be used in the sodium-ion secondary battery of the present invention is not particularly limited, and it can be produced by referring to the convention well-known findings as suitable. Hereinafter, the production method of this anode will be explained in brief.

The anode can be prepared by producing an anode active material slurry containing the anode active material, binding agent and solvent, applying this anode active material onto the current collector, allowing to dry, and then pressing.

More specifically, first, the anode active material slurry is produced by mixing the hard carbon, binding agent and other components as necessary. Since the specific constitution of each component blended into the anode active material slurry is as described above, an explanation will be omitted. The type of solvent and the mixing means are not particularly limited, and conventional well-known findings can be referred to as suitable.

Next, the anode active material slurry produced as described above is applied to the surface of the current collector prepared as described above to form a film. Although the application means for applying the anode active material slurry is also not particularly limited, for example, a means that is typically used in self-propelled coating and the like can be employed. However, if establishing the application means using an ink-jet system, doctor blade system, or a combination of these, a thin layer can be formed.

Next, the film formed on the surface of the current collector is allowed to dry. The solvent in the film is thereby removed. The drying means for causing the film to dry is not particularly limited, and conventional well-known findings concerning electrode production can be referred to as suitable. For example, heat treatment and the like can be exemplified. The drying conditions (drying time, drying humidity, etc.) are suitably set in accordance with the applied amount of the anode active material slurry and the volatilization rate of the solvent in the slurry.

Next, the film prepared as described above is pressed. The pressing means is not particularly limited, and a conventional well-known means can be employed as suitable. To give an example of the pressing means, a calendar roll, flat-plate press and the like can be exemplified.

Cathode

As the cathode to be used in the sodium-ion secondary battery of the present invention, a cathode having sodium metal or a cathode active material and a current collector can be exemplified. If there is a necessity, other components can be further included. For the current collector of the cathode, aluminum can be used in non-bipolar current collectors. Stainless steel can be used in bipolar batteries.

Cathode Active Material

Although the cathode active material is not particularly limited, a sodium-transition metal oxide is preferable. As the sodium-transition metal oxide, for example, $NaMn_2O_4$, $NaNiO_2$, $NaCoO_2$, $NaFeO_2$, $NaNi_{0.5}Mn_{0.5}O_2$, $NaCrO_2$ and the like can be exemplified. Depending on the case, two or more types of cathode active materials may be jointly used.

Other Components

Components other than the cathode active material may be contained in the cathode if necessary. For example, a binding agent, conductive additive, support salts, ion-conductive polymer, and the like can be exemplified. An agent similar to that described in the above explanation of the anode can be used for the binding agent.

Cathode Production Method

Although the production method of the cathode in a case of a cathode having the cathode active material and current collector is not particularly limited, it can be performed by a similar method as in the production of the above-mentioned anode. More specifically, the cathode can be produced by a method in which a cathode active material slurry is prepared by mixing the cathode active material, binding agent and other components as necessary in the solvent, the cathode active material slurry thus prepared is applied onto the current collector surface to cause a film to form, and finally, the film is dried.

Nonaqueous Electrolyte Solution

In the sodium-ion secondary battery of the present invention, a nonaqueous electrolyte solution containing a nonaqueous solvent substantially composed of saturated cyclic carbonate (excluding using ethylene carbonate independently), or a mixed solvent of saturated cyclic carbonate and linear carbonate, and an electrolyte salt.

Nonaqueous Solvent

The nonaqueous solvent to be used in the sodium-ion secondary battery of the present invention is characterized in being substantially composed of saturated cyclic carbonate (excluding using ethylene carbonate independently), or a mixed solvent of saturated cyclic carbonate and linear carbonate. The sodium-ion secondary battery exhibits superior charge/discharge efficiency and charge/discharge characteristics due to using the aforementioned hard carbon as the anode active material, and using substantially saturated cyclic carbonate (excluding using ethylene carbonate independently) or a mixed solvent of saturated cyclic carbonate and linear carbonate as the nonaqueous solvent. In addition, the sodium-ion secondary battery of the present invention is a secondary battery that can be used at room temperature due to using substantially saturated cyclic carbonate (excluding using ethylene carbonate independently), or a mixed solvent of saturated cyclic carbonate and linear carbonate as the nonaqueous solvent.

"Substantially" indicates the matter of the solvent contained in the above-mentioned nonaqueous solvent used in the present invention also containing other solvents in a range that does not affect the performance of the sodium-ion secondary battery, such as the charge/discharge characteristic, in addition to the nonaqueous solvent composed of saturated cyclic carbonate (excluding using ethylene carbonate independently), or nonaqueous solvent composed of a mixed solvent of saturated cyclic carbonate and linear carbonate. Hereinafter, explanations will be provided in the order of the saturated cyclic carbonate, linear carbonate, and other solvents.

Compounds represented by the following general formula (I) can be exemplified as the saturated cyclic carbonate, for example.

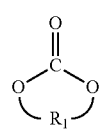

(I)

$R_1$ in the general formula (I) is an alkylene group having 2 to 4 carbon atoms.

Compounds represented by the above general formula (I) include ethylene carbonate, propylene carbonate, and butylene carbonate.

Compounds represented by the following general formula (II) can be exemplified as the linear carbonate, for example.

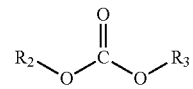

(II)

$R_2$ and $R_3$ in the general formula (II) are each independently an alkyl group having no more than 3 carbon atoms that may be the same or different from each other.

Compounds represented by the above general formula (II) include dimethyl carbonate, ethylmethyl carbonate, diethyl carbonate, methylpropyl carbonate, ethylpropyl carbonate, and dipropyl carbonate.

As the other solvents, ethers such as tetrahydrofuran; hydrocarbons such as hexane; lactones such as γ-butyl lactone; film forming additives (used in lithium-ion batteries) like vinylene carbonate and ethylene sulfite; dimethylsulfoxide; and the like can be exemplified.

As for the nonaqueous solvent used in the present invention, the sodium-ion secondary battery exhibits extremely superior cycle characteristics and extremely superior battery performance by using a nonaqueous solvent substantially composed of propylene carbonate, substantially a mixed solvent of ethylene carbonate and diethyl carbonate, or substantially a mixed solvent of ethylene carbonate and propylene carbonate.

As mentioned above, the nonaqueous solvent used in the present invention may contain ethylene carbonate. Ethylene carbonate is a solid at ambient temperature. As a result, in a case of using ethylene carbonate independently as the nonaqueous solvent, it will not make a secondary battery that is usable at ambient temperature. However, by making a mixed solvent of ethylene carbonate and a linear carbonate, or a mixed solvent of ethylene carbonate and another saturated cyclic carbonate, a sodium-ion secondary battery that is usable also at ambient temperature will be made.

Electrolyte Salt

The electrolyte salt used in the present invention is not particularly limited, and an electrolyte salt generally used in sodium-ion secondary batteries can be used.

As electrolyte salts generally used in sodium-ion secondary batteries, for example, $NaClO_4$, $NaPF_6$, $NaBF_4$, $CF_3SO_3Na$, $NaAsF_6$, $NaB(C_6H_5)_4$, $CH_3SO_3Na$, $CF_3SO_3Na$, $NaN(SO_2CF_3)_2$, $NaN(SO_2C_2F_5)_2$, $NaC(SO_2CF_3)_3$, $NaN(SO_3CF_3)_2$, and the like can be exemplified. It should be noted that one type among the above-mentioned electrolyte salts may be used, or a combination of two or more types thereof may be used.

In addition, although the concentration of the electrolyte salt in the nonaqueous electrolyte solution is not particularly limited, it is preferably 3 to 0.1 mol/l, and more preferably 1.5 to 0.5 mol/l.

Structure of Sodium-Ion Secondary Battery

The structure of the sodium-ion secondary battery of the present invention is not particularly limited, and in a case of classifying by shape and structure, it can adopt any conventional well-known shape and structure such as a layer-type (flat-type) battery or coil-type (cylindrical-type) battery. In addition, when viewed by the electrical connection configuration (electrode structure) inside the sodium-ion secondary battery, it can be applied to either an (internal parallel connection type) battery and a bipolar (internal series connection type) battery.

EXAMPLES

Hereinafter, the present invention will be explained in detail by providing Examples. It should be noted that the present invention is not to be limited to the Examples illustrated below.

Example 1

An anode active material slurry was prepared by adding in the appropriate amount NMP (N-methylpyrrolidone), which is a solvent, to solid contents composed of 90% by mass of hard carbon ("Carbotron P", made by Kureha Corporation) with an average particle size of 10 μm, which is the anode active material, and 10% by mass of polyvinylidene fluoride, which is the binding agent.

On the other hand, a nickel mesh was prepared as the current collector for the anode. A film was formed on one surface of the current collector thus prepared by applying the anode active material slurry prepared above by way of the doctor blade method. Next, this coating was made to vacuum dry while at 90° C.

Then, the manufacture of two-electrode beaker-type and coin-type sodium-ion secondary batteries was carried out. The electrode manufactured using the above-mentioned hard carbon was prepared for the working electrode and sodium metal was prepared for the counter electrode to manufacture the beaker-type and coin-type sodium-ion secondary batteries. For the nonaqueous electrolyte solution used during battery manufacture, a solution was employed in which 1 M electrolyte salt ($NaClO_4$) was dissolved in a nonaqueous solvent (propylene carbonate). In addition, the manufacture of the beaker-type and coin-type sodium-ion secondary batteries was carried out in a glove box filled with argon.

Example 2

A beaker-type sodium-ion secondary battery was manufactured by a similar method as the above-mentioned Example 1, except for dissolving 1 M $NaClO_4$ in a mixed solvent of propylene carbonate and dimethyl carbonate mixed in a 1:1 volume ratio.

Example 3

A beaker-type sodium-ion secondary battery was manufactured by a similar method as the above-mentioned Example 1, except for dissolving 1 M $NaClO_4$ in a mixed solvent of propylene carbonate and ethylmethyl carbonate mixed in a 1:1 volume ratio.

Example 4

A beaker-type sodium-ion secondary battery was manufactured by a similar method as the above-mentioned Example 1, except for dissolving 1 M $NaClO_4$ in a mixed solvent of propylene carbonate and diethyl carbonate mixed in a 1:1 volume ratio.

Evaluation 1

Charge/discharge evaluation of the two-electrode beaker-type batteries of Examples 1 to 4 manufactured as described above was carried out. It was established so that the current density to each electrode was a current of 25 mA/g, and constant current charging was performed until 0 V. After charging, it was established so that the current density to each electrode was a current of 25 mA/g, and constant current charging was performed until 2 V. It should be noted that the charging/discharging in Evaluation 1 was performed under conditions of a temperature of 25° C.

Figure 1B:
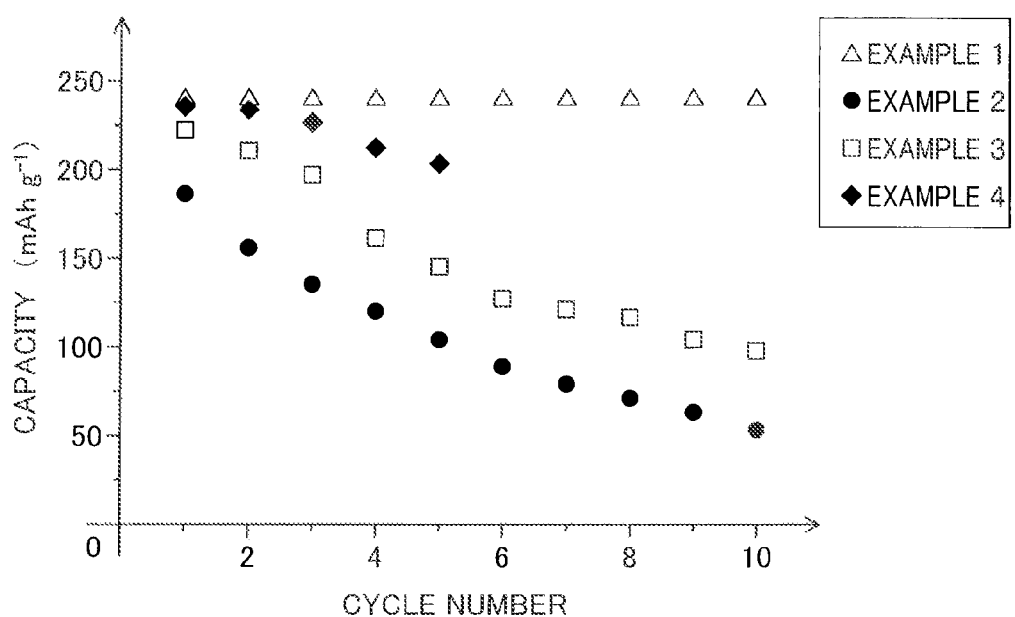
FIG. 1(b) is a graph showing a relationship between the cycle number and discharge capacity of the batteries prepared in Examples 1 to 4.

The initial charge/discharge curves for the batteries manufactured in Examples 1 to 4 are shown in FIG. 1(*a*), and the relationship between the cycle number and discharge capacity for the batteries manufactured in Examples 1 to 4 are shown in FIG. 1(*b*).

Based on FIG. 1(*a*), when comparing the batteries of Examples 2 to 4 using a mixed solvent of propylene carbonate and linear carbonate as the nonaqueous solvent with the battery of Example 1 using propylene carbonate as the nonaqueous solvent in regards to the initial charge/discharge of the batteries, it was confirmed that the discharge capacity for the batteries of Examples 1 and 4 is higher than the discharge capacity for the batteries of Examples 2 and 3. In addition, it was confirmed based on FIG. 1(*b*) that the discharge capacity for the battery of Example 1 did not degrade even when charge/discharge was repeated. Furthermore, it was confirmed that the discharge capacity for the battery of Example 4 had extremely little degradation even when charge/discharge was repeated.

Example 5

A beaker-type sodium-ion secondary battery was manufactured by a similar method as the above-mentioned Example 1, except for dissolving 1 M $NaClO_4$ in a mixed solvent of propylene carbonate and ethylene carbonate mixed in a 2:1 volume ratio.

Example 6

A beaker-type sodium-ion secondary battery was manufactured by a similar method as the above-mentioned Example 1, except for dissolving 1 M $NaClO_4$ in a mixed solvent of propylene carbonate and ethylene carbonate mixed in a 1:1 volume ratio.

Example 7

A beaker-type sodium-ion secondary battery was manufactured by a similar method as the above-mentioned Example 1, except for dissolving 1 M $NaClO_4$ in a mixed solvent of propylene carbonate and ethylene carbonate mixed in a 1:2 volume ratio.

Evaluation 2

Charge/discharge evaluation for the two-electrode beaker-type batteries of Examples 5 to 7 manufactured as described above was carried out by a similar method as Evaluation 1. The initial charge/discharge curves for the batteries manufactured in Examples 1 and 5 to 7 are shown in FIG. 2(*a*), and the relationship between the cycle number and discharge capacity for the batteries manufactured in Examples 1 and 5 to 7 are shown in FIG. 2(*b*).

Figure 2A:
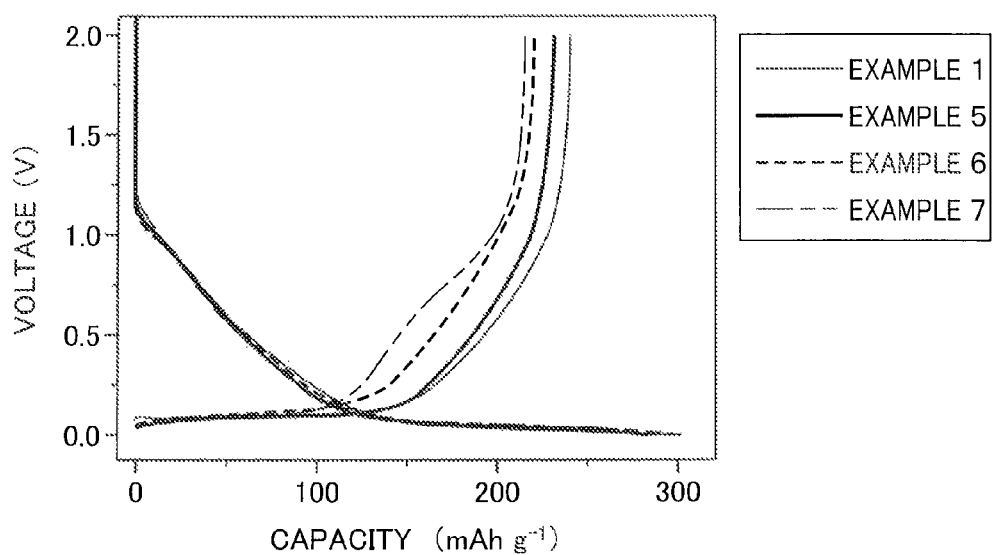
FIG. 2(a) is a graph showing the initial charge/discharge curves of the batteries prepared in Examples 1 and 5 to 7.

Based on FIG. 2(*a*), when comparing the batteries of Examples 5 to 7 using a mixed solvent of propylene carbonate and ethylene carbonate as the nonaqueous solvent with the battery of Example 1 using propylene carbonate as the nonaqueous solvent in regards to the initial charge/discharge of the batteries, it was confirmed that the discharge capacity for the batteries of Examples 1 and 5 is higher than the discharge capacity for the batteries of Examples 6 and 7.

Figure 2B:
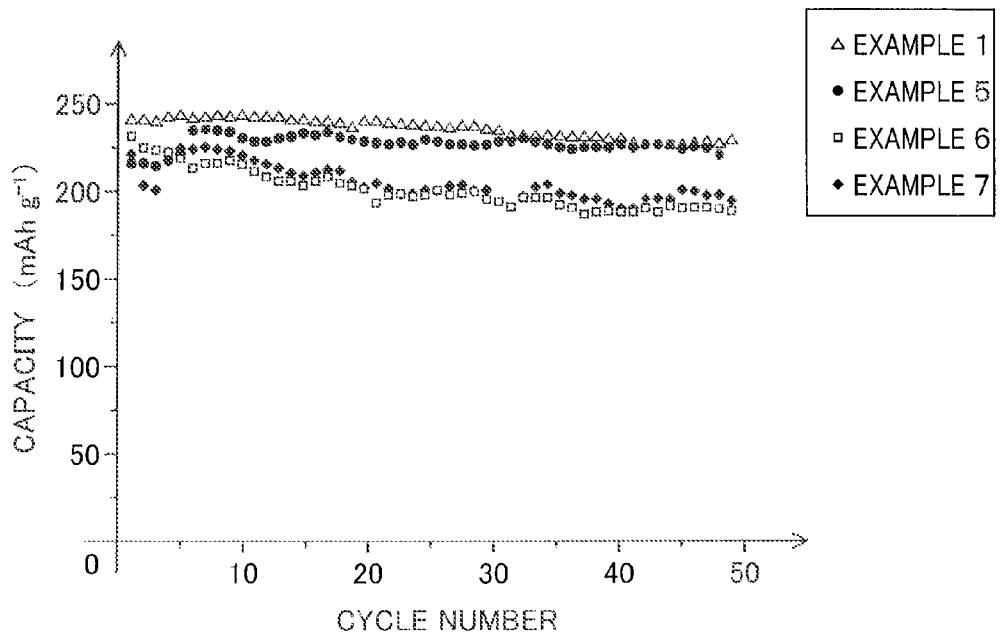
FIG. 2(b) is a graph showing a relationship between the cycle number and discharge capacity of the batteries prepared in Examples 1 and 5 to 7.

In addition, it was confirmed based on FIG. 2(b) that the discharge capacity for the battery of Examples 1 and 5 to 7 did not degrade even when charge/discharge was repeated.

Based on the results of FIGS. 1 and 2, it was confirmed that, when the nonaqueous solvent is substantially composed of propylene carbonate, the initial discharge capacity is extremely high, and the discharge capacity did not degrade even when charge/discharge was repeated.

Example 8

A two-electrode beaker-type sodium-ion secondary battery was manufactured by a similar method as the above-mentioned Example 1, except for dissolving 1 M $NaClO_4$ in a mixed solvent of ethylene carbonate and dimethyl carbonate mixed in a 1:1 volume ratio.

Example 9

A two-electrode beaker-type sodium-ion secondary battery was manufactured by a similar method as the above-mentioned Example 1, except for dissolving 1 M $NaClO_4$ in a mixed solvent of ethylene carbonate and ethylmethyl carbonate mixed in a 1:1 volume ratio.

Example 10

A two-electrode beaker-type sodium-ion secondary battery was manufactured by a similar method as the above-mentioned Example 1, except for dissolving 1 M $NaClO_4$ in a mixed solvent of ethylene carbonate and diethyl carbonate mixed in a 1:1 volume ratio.

Evaluation 3

Charge/discharge evaluation for the two-electrode beaker-type batteries of Examples 8 to 10 manufactured as described above was carried out by a similar method as Evaluation 1. The initial charge/discharge curves for the batteries manufactured in Examples 8 to 10 are shown in FIG. 3(a), and the relationship between the cycle number and discharge capacity for the batteries manufactured in Examples 8 to 10 are shown in FIG. 3(b).

Figure 3A:
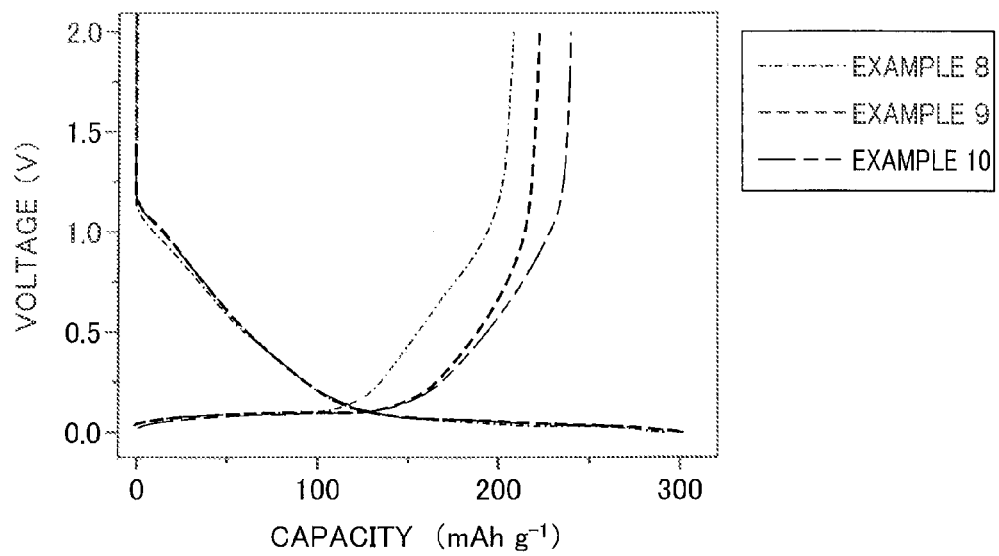
FIG. 3(a) is a graph showing initial charge/discharge curves of the batteries prepared in Examples 8 to 10.
Figure 3B:
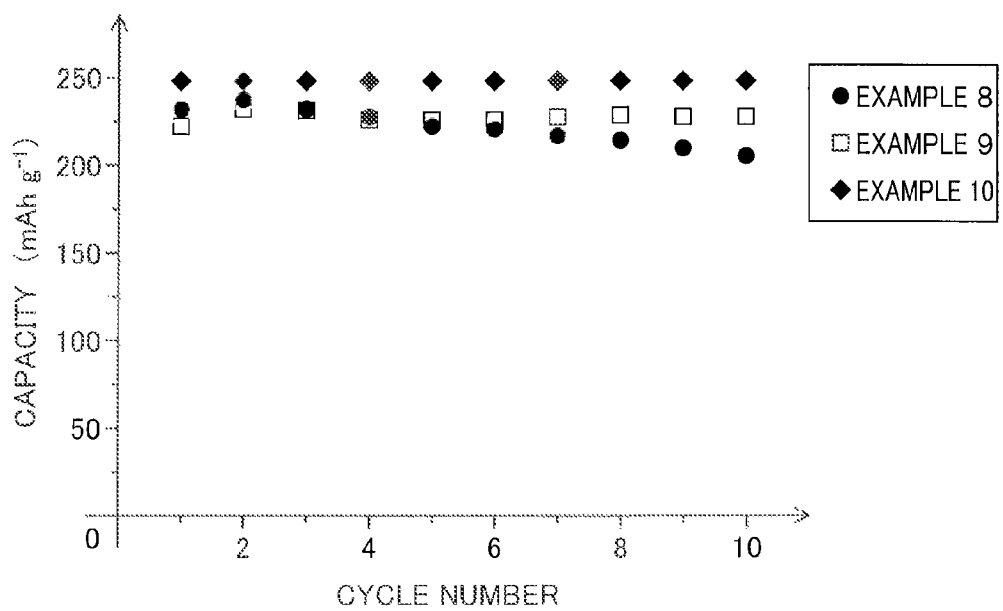
FIG. 3(b) is a graph showing a relationship between the cycle number and discharge capacity of the batteries prepared in Examples 8 to 10.

Based on FIG. 3(a), when comparing the batteries of Examples 8 to 10 using a mixed solvent of ethylene carbonate and linear carbonate as the nonaqueous solvent in regards to the initial charge/discharge of the batteries, it was confirmed that the discharge capacity for the battery of Example 10 is higher than the discharge capacity for the batteries of Examples 8 and 9. In addition, it was confirmed based on FIG. 3(b) that the discharge capacity for the battery of Example 10 did not degrade even when charge/discharge was repeated.

Based on the results of FIGS. 2 and 3, it was confirmed that, by ethylene carbonate, for which independent use as the nonaqueous solvent is difficult at room temperature, being set as the nonaqueous solvent by making a mixed solvent with propylene carbonate (mixing ratio of Example 5), or a mixed solvent with diethyl carbonate (1:1 mixing ratio), the initial discharge capacity of the battery is extremely high, and the discharge capacity of the battery did not degrade even when charge/discharge was repeated.

In addition, based on FIGS. 1 and 3, it was confirmed that diethyl carbonate is preferable as the linear carbonate to be combined with saturated cyclic carbonates such as propylene carbonate and ethylene carbonate.

Example 11

A two-electrode beaker-type sodium-ion secondary battery was manufactured by a similar method as the above-mentioned Example 1, except for causing 1 M $NaClO_4$ to dissolve in butylene carbonate.

Example 12

A two-electrode beaker-type sodium-ion secondary battery was manufactured by a similar method as the above-mentioned Example 1, except for dissolving 1 M $NaClO_4$ in a mixed solvent of butylene carbonate and dimethyl carbonate mixed in a 1:1 volume ratio.

Evaluation 4

Charge/discharge evaluation for the two-electrode beaker-type batteries of Examples 11 and 12 manufactured as described above was carried out by a similar method as Evaluation 1. The initial charge/discharge curves for the batteries manufactured in Examples 11 and 12 are shown in FIG. 4(a), and the relationship between the cycle number and discharge capacity for the batteries manufactured in Examples 11 and 12 are shown in FIG. 4(b).

Figure 4A:
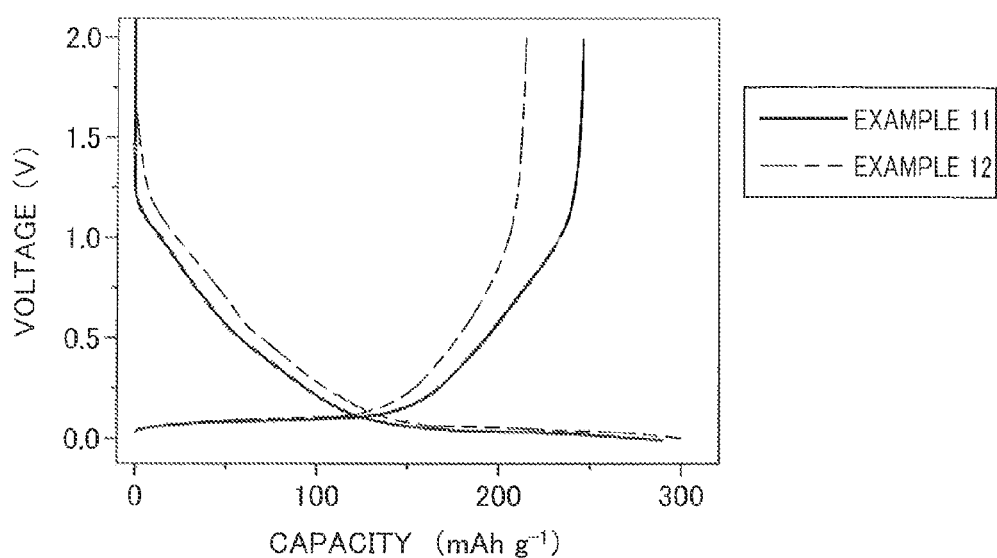
FIG. 4(a) is a graph showing initial charge/discharge curves of the batteries prepared in Examples 11 and 12.
Figure 4B:
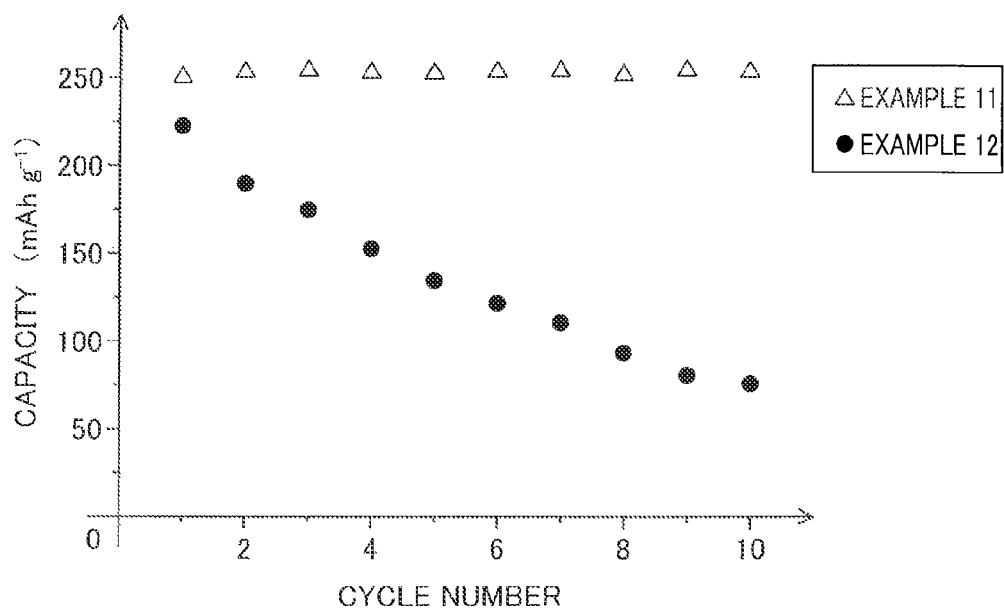
FIG. 4(b) is a graph showing a relationship between cycle number and discharge capacity of the batteries prepared in Examples 11 and 12.

Based on FIG. 4(a), when comparing the battery of Example 12 using a mixed solvent of butylene carbonate and dimethyl carbonate as the nonaqueous solvent with the battery of Example 11 using butylene carbonate as the nonaqueous solvent in regards to the initial charge/discharge of the batteries, it was confirmed that the discharge capacity for the battery of Example 11 is higher than the discharge capacity for the battery of Example 12. In addition, it was confirmed based on FIG. 4(b) that the discharge capacity for the battery of Example 12 did not degrade even when charge/discharge was repeated.

Based on the results of FIGS. 1 and 4, it was confirmed that, when the nonaqueous solvent is substantially composed of saturated cyclic carbonate, the initial discharge capacity is extremely high, and the discharge capacity did not degrade even when charge/discharge was repeated.

Example 13

A two-electrode coin-type sodium-ion secondary battery was manufactured by a similar method as the above-mentioned Example 1, except for dissolving 1 M electrolyte salt ($NaPF_6$) in a nonaqueous solvent (propylene carbonate).

Example 14

A two-electrode coin-type sodium-ion secondary battery was manufactured by a similar method as the above-mentioned Example 1, except for dissolving 1 M electrolyte salt (NaTFSA) in a nonaqueous solvent (propylene carbonate).

Evaluation 5

Figure 5A:
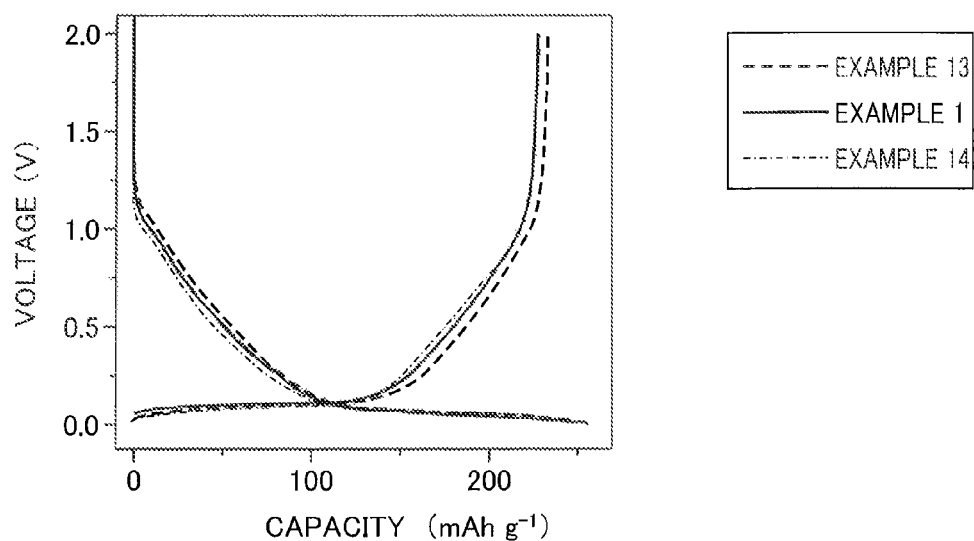
FIG. 5(a) is a graph showing initial charge/discharge curves of the batteries prepared in Examples 1, 13 and 14.
Figure 5B:
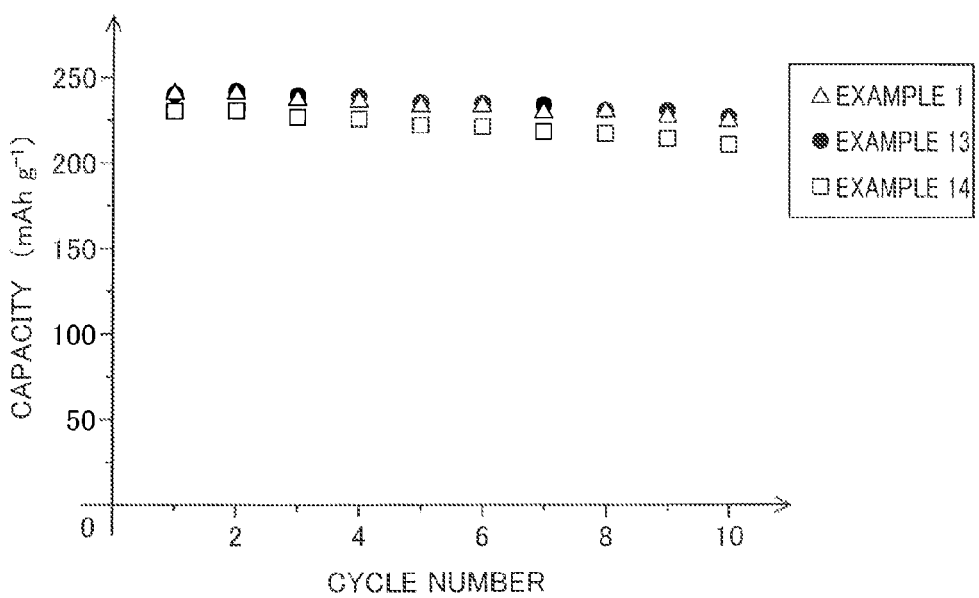
FIG. 5(b) is a graph showing a relationship between cycle number and discharge capacity of the batteries prepared in Examples 1, 13 and 14.

Charge/discharge evaluation for the two-electrode coin-type batteries of Examples 13 and 14 manufactured as described above was carried out by a similar method as Evaluation 1. The initial charge/discharge curves for the batteries manufactured in Examples 1, 13 and 14 are shown in FIG. 5(a), and the relationship between the cycle number and discharge capacity for the batteries manufactured in Examples 1, 13 and 14 are shown in FIG. 5(b). It should be noted that the results of Example 1 shown in FIGS. 5(*a*) and (*b*) are results evaluating a coin-type sodium-ion secondary battery of Example 1.

Based on FIG. 5(*a*), it was confirmed that the initial discharge capacity was high irrespective of the type of electrolyte salt. Based on FIG. 5(*b*), it was confirmed that the discharge capacity of the battery did not degrade even when charge/discharge was repeated, irrespective of the type of electrolyte salt.

Example 15

A two-electrode coin-type sodium-ion secondary battery was manufactured by a similar method as the above-mentioned Example 1, except for using copper foil as the current collector for the anode.

Example 16

A two-electrode coin-type sodium-ion secondary battery was manufactured by a similar method as the above-mentioned Example 1, except for using aluminum foil as the current collector for the anode.

Evaluation 6

Charge/discharge evaluation for the two-electrode coin-type batteries of Examples 15 and 16 manufactured as described above was carried out by a similar method as Evaluation 1. The initial charge/discharge curves for the batteries manufactured in Examples 15 and 16 are shown in FIG. 6(*a*), and the relationship between the cycle number and discharge capacity for the batteries manufactured in Examples 15 and 16 are shown in FIG. 6(*b*).

Figure 6A:
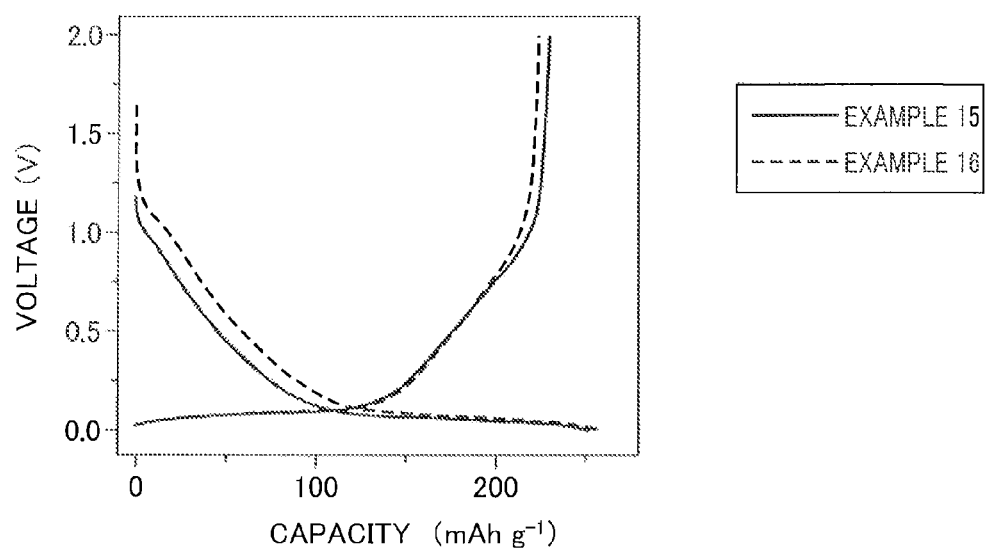
FIG. 6(a) is a graph showing initial charge/discharge curves of the batteries prepared in Examples 15 and 16.
Figure 6B:
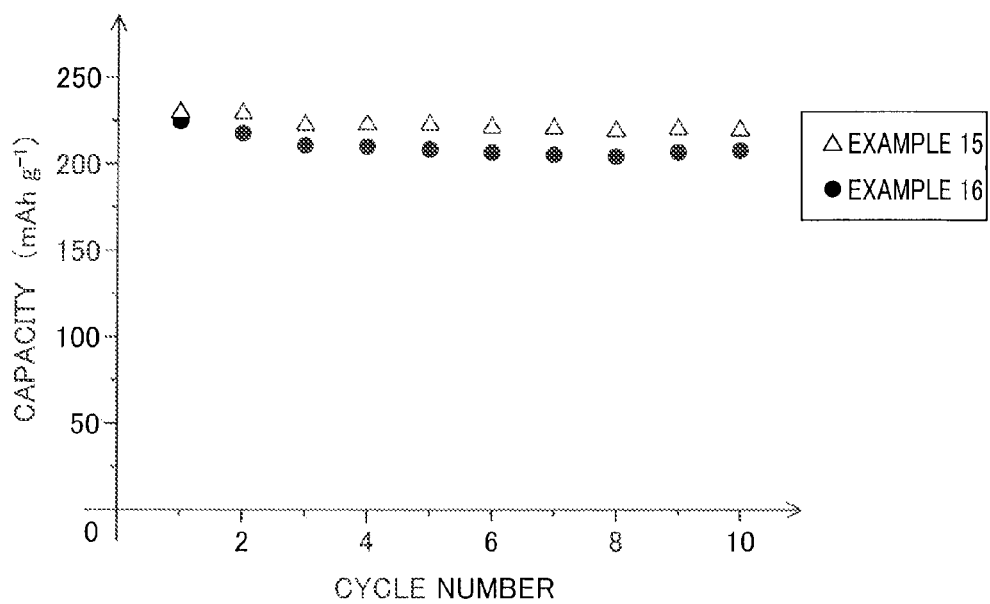
FIG. 6(b) is a graph showing a relationship between cycle number and discharge capacity of the batteries prepared in Examples 15 and 16.

Based on FIG. 6(*a*), it was confirmed that the initial discharge capacity was high irrespective of the type of current collector. Based on FIG. 6(*b*), it was confirmed that the discharge capacity of the battery did not degrade even when charge/discharge was repeated, irrespective of the type of current collector.

Example 17

A two-electrode coin-type sodium-ion secondary battery was manufactured by a similar method as the above-mentioned Example 1, except for using $NaNi_{0.5}Mn_{0.5}O_2$ in the counter electrode, and dissolving 1 M electrolyte salt (NaTFSA) in a nonaqueous solvent (propylene carbonate).

Evaluation 7

Charge/discharge evaluation for the two-electrode coin-type battery of Example 17 manufactured as described above was carried out by a similar method as Evaluation 1. The initial charge/discharge curves for the $10^{th}$ cycle of the battery manufactured in Example 17 are shown in FIG. 7(*a*), and the relationship between the cycle number and discharge capacity for the battery manufactured in Example 17 is shown in FIG. 7(*b*).

Figure 7A:
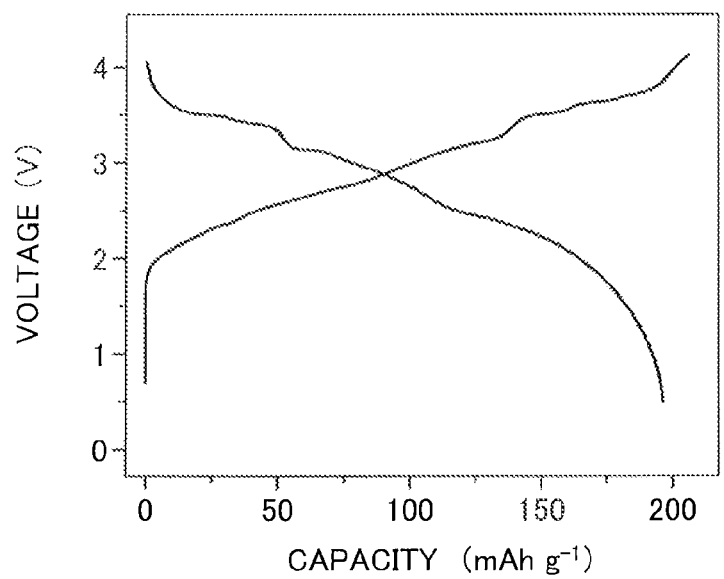
FIG. 7(a) is a graph showing charge/discharge curves of a 10$^{th}$ cycle of the battery prepared in Example 17.
Figure 7B:
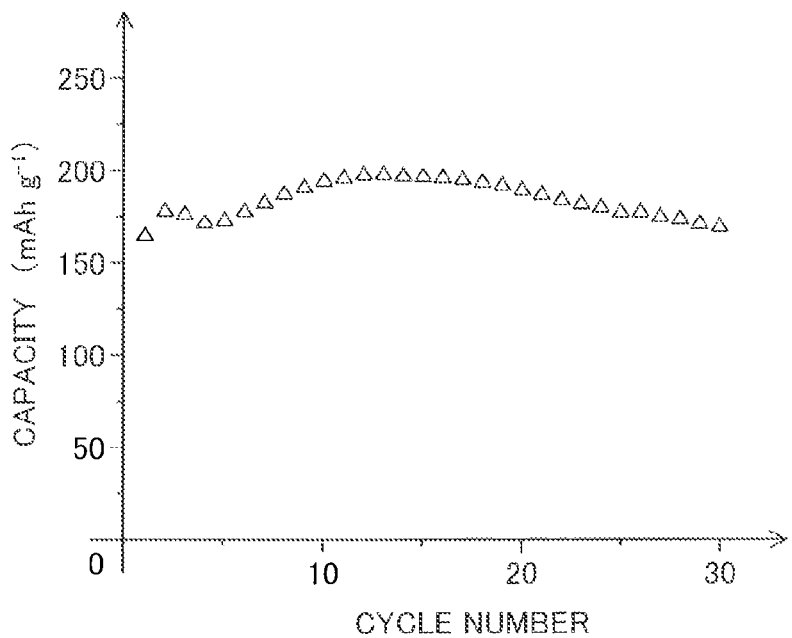
FIG. 7(b) is a graph showing a relationship between cycle number and discharge capacity of the battery prepared in Example 17.

Based on FIG. 7(*a*), it was confirmed that the discharge capacity was high, even when using a sodium-transition metal oxide in the cathode. Based on FIG. 7(*b*), it was confirmed that the discharge capacity of the battery did not degrade even when charge/discharge was repeated.

The invention claimed is:

1. A sodium-ion secondary battery comprising:
   a cathode;
   an anode having an anode active material, wherein the anode active material is hard carbon; and
   a non-aqueous electrolyte solution containing a non-aqueous solvent,
   wherein the non-aqueous solvent consists essentially of one selected from the group consisting of (a) propylene carbonate, (b) a mixed solvent substantially of ethylene carbonate and diethyl carbonate, and (c) a mixed solvent substantially of ethylene carbonate and propylene carbonate.

2. The sodium-ion secondary battery of claim 1, wherein the non-aqueous solvent consists essentially of propylene carbonate.

3. The sodium-ion secondary battery of claim 1, wherein the non-aqueous solvent consists essentially of the mixed solvent substantially of ethylene carbonate and diethyl carbonate.

4. The sodium-ion secondary battery of claim 1, wherein the non-aqueous solvent consists of the mixed solvent substantially of ethylene carbonate and propylene carbonate.

5. The sodium-ion secondary battery of claim 3, wherein the mixed solvent comprises ethylene carbonate and diethyl carbonate in a 1:1 volume ratio.

* * * * *